United States Patent
Gowers

(10) Patent No.: US 10,695,760 B2
(45) Date of Patent: Jun. 30, 2020

(54) APPARATUS AND METHOD

(71) Applicant: Smiths Detection-Watford Limited, Hertfordshire (GB)

(72) Inventor: Jonathan Marcel Gowers, Hertfordshire (GB)

(73) Assignee: SMITHS DETECTION-WATFORD LIMITED, Hertfordshire (GB)

( * ) Notice: Subject to any disclaimer, the term of this patent is extended or adjusted under 35 U.S.C. 154(b) by 255 days.

(21) Appl. No.: 15/536,838

(22) PCT Filed: Dec. 18, 2015

(86) PCT No.: PCT/GB2015/054096
§ 371 (c)(1),
(2) Date: Jun. 16, 2017

(87) PCT Pub. No.: WO2016/097771
PCT Pub. Date: Jun. 23, 2016

(65) Prior Publication Data
US 2017/0361319 A1    Dec. 21, 2017

(30) Foreign Application Priority Data
Dec. 18, 2014 (GB) .................... 1422678.1

(51) Int. Cl.
*B01L 3/00* (2006.01)
*B01J 19/00* (2006.01)
(Continued)

(52) U.S. Cl.
CPC ..... *B01L 3/502707* (2013.01); *B01J 19/0093* (2013.01); *B01L 3/50273* (2013.01);
(Continued)

(58) Field of Classification Search
CPC .......... B01J 19/0093; B01J 2219/00783; B01J 2219/00833; B01J 2219/0086;
(Continued)

(56) References Cited

U.S. PATENT DOCUMENTS 4,311,669 A    1/1982 Spangler
4,428,907 A *  1/1984 Heijenga .............. G01N 21/783
                                                128/202.22
(Continued)

FOREIGN PATENT DOCUMENTS

CN        1477054 A     2/2004
CN      101937822 A     1/2011
(Continued)

OTHER PUBLICATIONS

Examination Report dated Nov. 28, 2018 for EP App. No. 15826151.1.
(Continued)

*Primary Examiner* — Jennifer Wecker
(74) *Attorney, Agent, or Firm* — Kevin E. West; Advent, LLP

(57) ABSTRACT

A channel assembly is disclosed, which may comprise a microfluidic channel. Methods of manufacture are also disclosed as are detectors and detector components which may comprise such a channel assembly. An example is a detection apparatus comprising: a detector for detecting a substance of interest; and a pneumatic system comprising a microfluidic channel assembly comprising a first microfluidic channel for dispensing vapour to the detector, wherein the first microfluidic channel comprises a groove in a surface of a polymer body and a wall of the first channel is provided by a film bonded to the surface of the body over the groove.

20 Claims, 2 Drawing Sheets

(51) Int. Cl.
*G01N 27/447* (2006.01)
*G01N 27/62* (2006.01)

(52) U.S. Cl.
CPC ...... *B01L 3/502715* (2013.01); *G01N 27/447* (2013.01); *B01J 2219/0086* (2013.01); *B01J 2219/00783* (2013.01); *B01J 2219/00833* (2013.01); *B01J 2219/00867* (2013.01); *B01J 2219/00885* (2013.01); *B01J 2219/00921* (2013.01); *B01J 2219/00986* (2013.01); *B01J 2219/00988* (2013.01); *B01L 2200/0689* (2013.01); *B01L 2300/0887* (2013.01); *B01L 2300/123* (2013.01); *B01L 2400/0487* (2013.01); *G01N 27/622* (2013.01)

(58) Field of Classification Search
CPC .... B01J 2219/00867; B01J 2219/00885; B01J 2219/00921; B01J 2219/00986; B01J 2219/00988; B01L 2200/0689; B01L 2300/0887; B01L 2300/123; B01L 2400/0487; B01L 3/502707; B01L 3/502715; B01L 3/50273; G01N 27/447; G01N 27/622
See application file for complete search history.

(56) References Cited

U.S. PATENT DOCUMENTS

| | | | |
|---|---|---|---|
| 4,892,383 A | 1/1990 | Klainer et al. | |
| 6,878,255 B1 | 4/2005 | Wang et al. | |
| 8,591,814 B2 | 11/2013 | Hodges | |
| 2002/0045265 A1* | 4/2002 | Bergh | B01J 4/00 436/37 |
| 2003/0146377 A1 | 8/2003 | Miller et al. | |
| 2003/0214057 A1* | 11/2003 | Huang | B01J 19/0093 264/1.1 |
| 2004/0067171 A1 | 4/2004 | Icke et al. | |
| 2007/0072287 A1* | 3/2007 | Morisette | B01L 3/502715 435/287.2 |
| 2008/0003145 A1* | 1/2008 | Nurse | B01L 3/502738 422/400 |
| 2009/0111192 A1* | 4/2009 | Kitazawa | B01L 3/50273 436/172 |
| 2010/0154519 A1 | 6/2010 | Fontana | |
| 2013/0061961 A1 | 3/2013 | Rapp | |
| 2013/0118621 A1 | 5/2013 | Weber et al. | |

FOREIGN PATENT DOCUMENTS

| | | |
|---|---|---|
| CN | 101415497 B | 6/2013 |
| EP | 1337336 B1 | 8/2003 |
| EP | 1813348 A1 | 8/2007 |
| EP | 2251698 A1 | 11/2010 |
| EP | 2734018 A1 | 5/2014 |
| EP | 2745977 A1 | 6/2014 |
| FR | 2330005 A1 | 5/1977 |
| GB | 2369086 A | 5/2002 |
| JP | 2001124716 A | 5/2001 |
| JP | 2006142198 A | 6/2006 |
| JP | 2011005705 A | 1/2011 |
| JP | 2014122831 A | 7/2014 |
| WO | 2009101845 A1 | 8/2009 |
| WO | 2010150811 A1 | 12/2010 |
| WO | 2014045067 A1 | 3/2014 |
| WO | 2015078821 A1 | 6/2015 |

OTHER PUBLICATIONS

Martin, Michael et al., "Microfabricated vapor preconcentrator for portable ion mobility spectroscopy", Elsevier, ScienceDirect, Sensors and Actuators B 126 (2007) pp. 447-454.
International Search Report dated Jun. 13, 2016 for PCT/GB2015/054096.
Combined Search and Examination Report dated Jun. 19, 2015 for Application No. GB1422678.1.
Search Report and Examination Report for Appl. No. GB1422678.1, dated Jul. 24, 2018.
Search Report dated Aug. 21, 2017 for GB Application No. GB1422678.1.
Office Action from Chinese Patent Application No. 201580069153.4, dated Feb. 3, 2019.
Office Action from Chinese Application No. 201580069153.4, dated Oct. 8, 2019.
Office Action from Japanese Application No. 2017-533306, dated Nov. 9, 2019.
Office Action from Russian Application No. 2017122185/04, dated Oct. 28, 2019.
Office Action for Russian Application No. 2017122185/04(038391), dated May 31, 2019.

* cited by examiner

APPARATUS AND METHOD

The present disclosure relates to a channel assembly, which may comprise a microfluidic channel, and to a method of manufacture of such an assembly, and to detectors and detector components which may comprise such a channel assembly.

BACKGROUND

Detection devices such as detectors and analysers for detecting and/or identifying substances, and some medical devices, may comprise flow paths for moving fluid. There is a need to enclose these flow paths and to protect them from contamination. Channels for fluid flow may be formed by connecting components together using gaskets, O-rings, hosing, and clamps. Elastomeric components used in such gaskets and O-rings may be susceptible to fatigue and/or "outgassing" in which they release substances which may contaminate or confound a detector. It is also possible that such components, and/or simple irregularities such as protrusions or recesses in the walls of channels which carry fluid flow, may cause deposits of fluid to be retained. Substances which are retained in this way may also be a source of contamination and/or outgassing.

Detection devices may be used for detecting the presence of hazardous or illegal materials and in some cases it may be desirable to provide handheld devices so that personnel can easily deploy them in the field. Detection devices, such as ion mobility spectrometers and mass spectrometers, may comprise complex electronics and employ high voltages and strong magnetic fields. These may make very considerable power demands, and short battery life may reduce the usefulness of such devices.

Environmental concerns, and cost constraints, also mean that it is desirable to be able to maintain and repair such devices. It is however a problem that the act of repair may introduce contaminants. Without returning a device to its manufacturer it may not be possible to replace gaskets, O-rings, clamps or other components in a way that would sufficiently prevent leaks from the device or would protect the device from contamination and so preserve its reliability.

SUMMARY

Aspects and examples of the disclosure are set out in the claims. Subject matter of the claims aims to address at least part of the above described technical problems.

BRIEF DESCRIPTION OF DRAWINGS

Embodiments of the disclosure will now be described, by way of example only, with reference to the accompanying drawings, in which:

FIG. 1-B shows a plan view of the channel assembly illustrated in FIG. 1-A;
FIG. 1-C shows one possible arrangement of a channel;
FIG. 2-B shows a plan view of a component suitable for use in the detection apparatus illustrated in FIG. 2-A;
FIG. 2-C shows a plan view of another component suitable for use in the detection apparatus illustrated in FIG. 2-A;
and
FIG. 2-D shows a schematic section view of the component illustrated in FIG. 2-C.

It will be appreciated that in the drawings like reference numerals are used to indicate like elements.

SPECIFIC DESCRIPTION

Figure 1A:
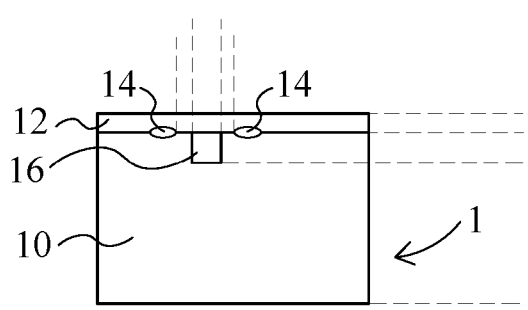
FIG. 1-A shows a section view of a channel assembly.
Figure 1B:
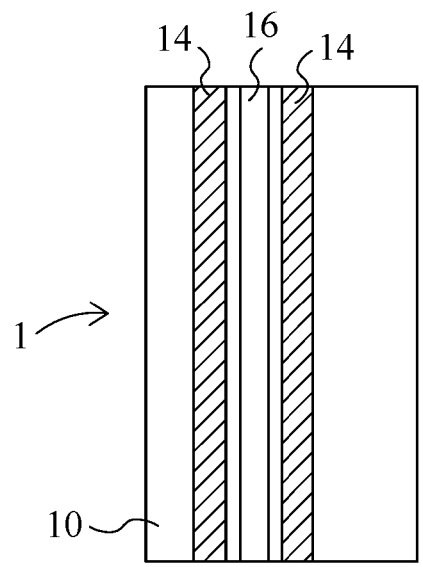
Figure 1C:
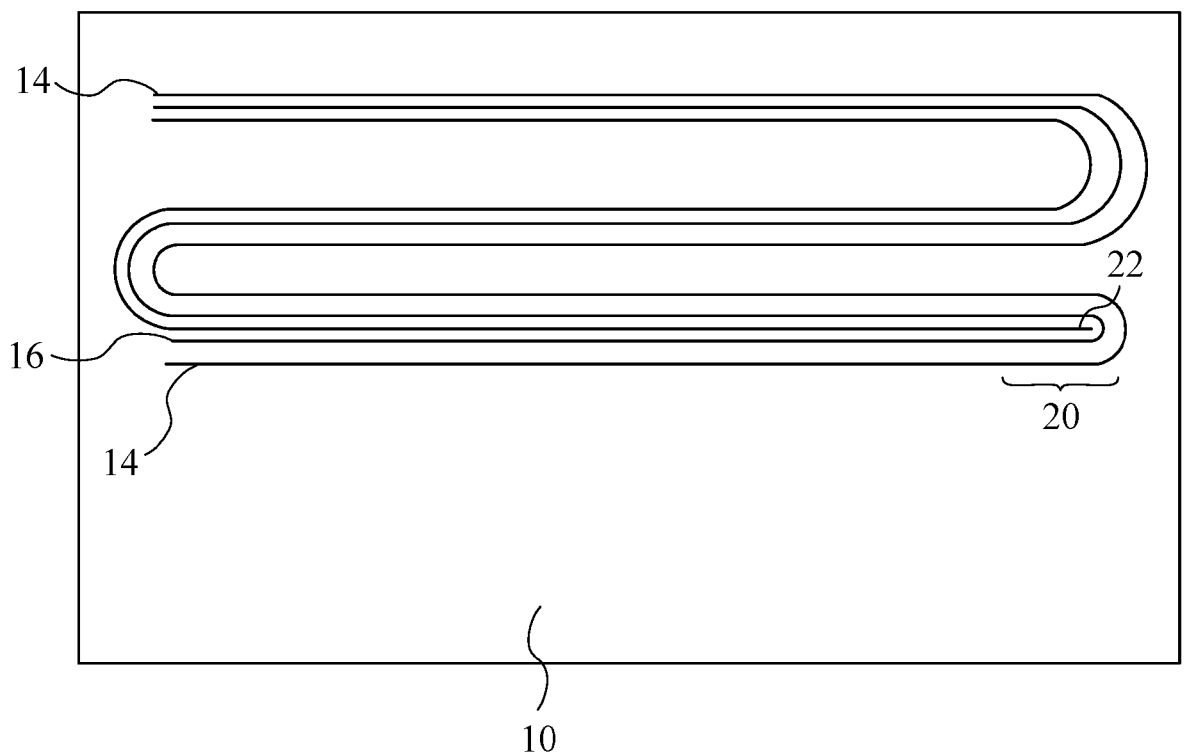
Figure 2A:
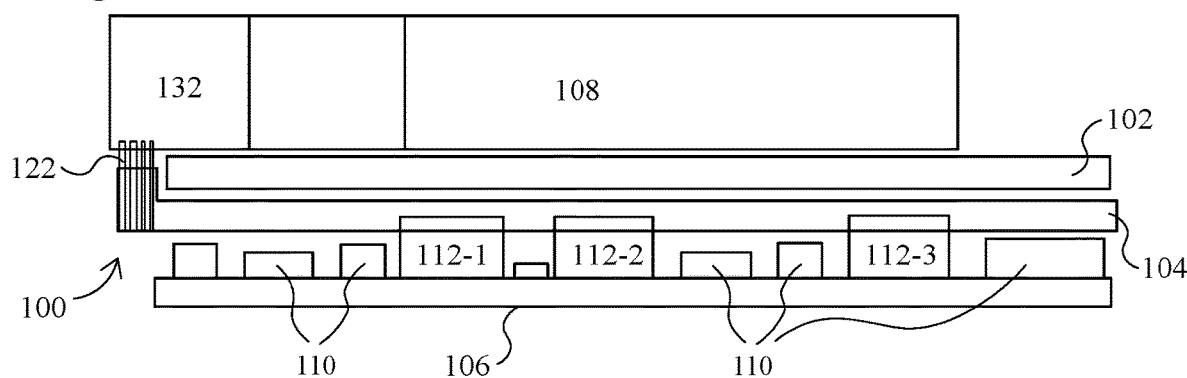
FIG. 2-A shows a schematic view of a detection apparatus.
Figure 2B:
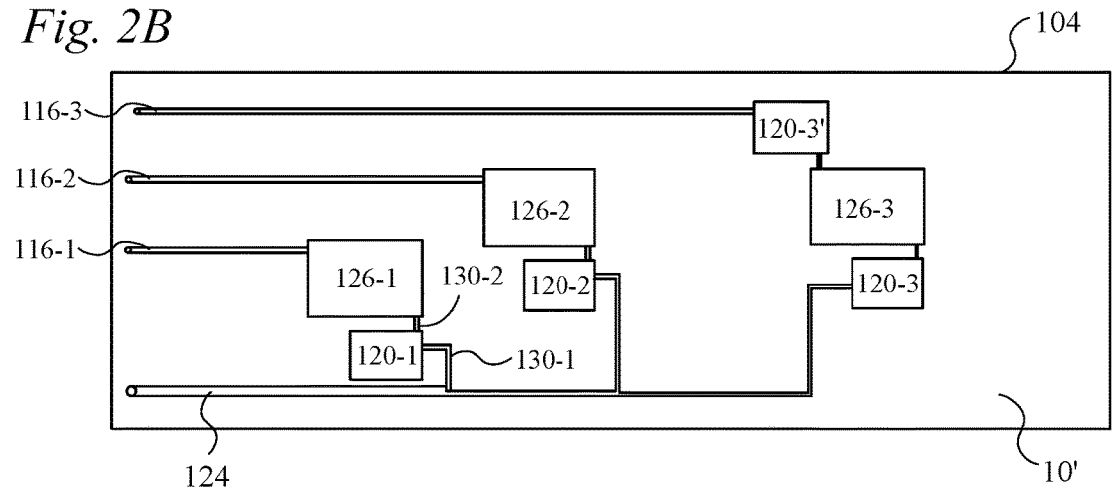
Figure 2C:
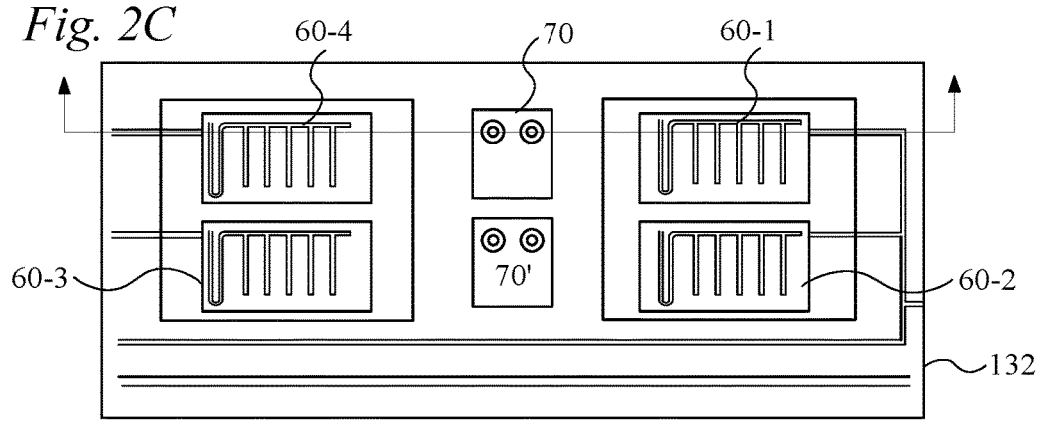
Figure 2D:
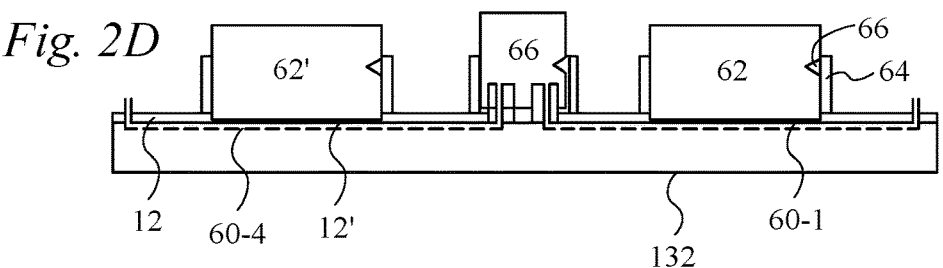

FIG. 1 shows a microfluidic channel assembly 1 suitable for the manufacture of components in detection devices and medical apparatus.

The assembly illustrated in FIG. 1 comprises a polymer film 12 and a polymer body 10. An elongate groove 16 is provided in a surface of the polymer body 10, and the polymer film 12 is arranged to at least partially cover the surface such that the film 12 covers, and encloses, the groove 16 to create a channel. The cross section and length of the channel may be sized so that fluid in the channel exhibits microfluidic properties such as low or slow diffusion along the channel. For example the channel may be configured so that there may be no movement of fluid along the channel (including negligible, or zero, diffusion) unless a fluid is pumped along the channel by a pressure difference.

The film 12 may be less than 500 µm thick for example less than 250 µm. The body 10 may be at least 2 mm thick, for example at least 5 mm thick.

The film 12 may be secured to the polymer body 10 by the film 12 and body 10 being at least partially fused together along an elongate track. The groove 16 may be bounded on each side by such a track. The groove 16 may be less than 500 µm in width, and may be less than 500 µm deep. The groove 16 may be square in cross section (as it is shown in FIG. 1) but it will also be appreciated that it may have a cross section of another shape, for example a rectangular cross section. Depending on how the channel is created, the shape of the cross section (square or otherwise) may be somewhat irregular, for example the corners may not be entirely sharp due to the manufacturing process or other constraints.

The film 12 and body 10 may comprise the same material, for example they may consist essentially of the same material, and may comprise PEEK or Nylon. The polymer film 12 may be light transmitting, for example by virtue of its thickness and/or the material it comprises. For example it may comprise a light transmitting material, for example it may be transparent to light having wavelengths shorter than 1800 nm. The polymer body 10 may comprise a light absorbing material, for example a material that absorbs light in the wavelength range in which the film 12 transmits light. For example the polymer body 10 may comprise a material adapted to cause heating when exposed to light in the wavelength range 1060 nm to 1080 nm. For example, the polymer body 10 may comprise carbon black. In an embodiment the track comprises a weld, for example formed by transmission laser welding.

As illustrated in FIG. 1, the elongate track may follow the elongate groove 16 along the surface. As already noted, the groove 16 may be bounded on either side by elongate tracks. The tracks may each comprise welds arranged to provide a gas tight seal, for example the gas tight seal may be arranged to remain gas tight when the pressure difference between the inside of the channel and the outside of the channel is up to at least 300 mBar, for example up to at least 500 mBar, for example up to at least 700 mBar. The tracks are generally spaced from the edge of the groove 16 so that an area of unfused film separates the (fused) track from the edge of groove 16. The spacing between each elongate track and the nearest edge of the groove 16 may be greater than 50 µm, for example greater than 75 µm, for example less than 500 µm, for example less than 300 µm. Such embodiments of the disclosure may reduce or avoid accumulation of contaminants in the microfluidic channel, for example the cross section of the groove may not be compromised by the process of welding along the track. It will be appreciated that in the area of unfused film between the track and the groove, the film may abut the body to exclude the accumulation of vapour in that area. Accordingly, the distance between track and groove may be selected based on the thickness of the polymer film and/or the width of the elongate track.

The groove 16 and track illustrated in FIG. 1-B are shown as following a straight path, but it will be appreciated that they may follow a winding or tortuous path across the surface of the polymer body 10. In addition, the polymer body 10 may comprise grooves on more than one surface, and one or more holes (e.g. tunnels) may be provided in the bulk of the body 10 to link a channel on one surface to a channel on another surface of the body 10 thereby to provide more complex 3D channel structures.

The elongate track may be between 0.1 mm and 1.2 mm in width, for example it may be wider than 0.2 mm, for example wider than 0.3 mm, for example wider than 0.4 mm. Generally the track is narrower than 1.1 mm, for example narrower than 1 mm, for example narrower than 0.9 mm.

As illustrated in FIG. 1-C, the channel may define a tortuous or folded path, for example the channel may comprise bends such as corners which may be arranged to provide reversals in the direction of the channel. As illustrated in FIG. 1-C the presence of such corners may provide an area of the body 10 that is bounded on at least two sides by the channel. A welding land may be disposed in this area 20 and may be less than 2 mm in width. For example, two parallel channels may be separated, and sealed along at least a part of their common border, by a single weld. The spacing between the track, or tracks, and the channel may be greater near to such bends in the channel than along straight regions of the channel.

Such assemblies may provide channels having microfluidic properties, and may be used in fluid flow systems and pneumatic systems and interfaces for detectors, such as ion mobility spectrometers.

To manufacture channel assemblies of the disclosure, a process may begin by cutting a groove 16, or a plurality of grooves, into a surface of a single polymer block. This may be achieved using a laser, which may be pre-programmed, or a CNC machine. Examples of lasers include micromachining lasers such as ablation lasers, for example carbon dioxide, copper vapour, and excimer lasers. Examples of CNC machines include 5 axis milling machines, such as a HAAS VS3-SSYT. Such CNC machines may be adapted to cut grooves having a width of about 300 μm or more, some CNC machines may be able to cut narrower channels. Suitable CNC machines may be obtained from Haas Europe, of Mercuriusstraat 28, B-1930 Zaventem, Belgium.

The laser may be configured to cut groove(s) into the body 10 so they have a width of a few tens of microns, for example 50 μm, for example less than 100 μm. A film 12 comprising the same polymer as the body 10 may then be placed on the surface (e.g. on top of the groove or grooves). A laser beam is then controlled to follow a track, adjacent to the groove(s). For example the track may be arranged to bound at least one side of the channel as explained above with reference to FIG. 1-C. The film 12 may be pressed against the body 10, for example by being clamped or otherwise held in place.

The laser may then be controlled to perform a pre-heating pass along at least part of the track during which the components are warmed. The laser may then be controlled to perform a welding pass along the track, thereby to at least partially fuse the material of the film 12 with the material of the block along the track. Fusing the film 12 to the body 10 in this way may provide a weld, such as a micro-weld, configured to provide a gas tight seal between the film 12 and the body 10. The laser beam may have a typically focussed spot size of 0.4 mm to 0.8 mm. This process of fusing the film 12 to the body 10 may be performed by transmission laser welding, for example the body 10 and film 12 may have different light transmitting properties, for example they may comprise different concentrations of a light absorbing substance adapted to be heated by the laser light, for example they may comprise different concentrations of carbon black. In some embodiments both the film 12 and body 10 may be transparent. In these embodiments the body 10 and film 12 may be heated using a longer wavelength laser and focusing the beam waist at the same depth as the interface between the body 10 and the film 12. This may enable both the film 12 and body 10 to be heated together at the interface without the need for a light absorbing additive.

It may be useful to flush the groove 16 with a gas, such as nitrogen or another purge gas, during the process of fusing the film 12 to the body 10. For example the method may comprise passing a flow of such a gas through the groove 16 beneath the film 12 while the track(s) is (are) being welded. The process of cutting the channel and fusing the film 12 to the body 10 may be performed in an enclosed chamber, which may be free from contaminants and dust. For example, once the groove 16 has been cut, the body 10 may remain in the enclosed chamber until the film 12 has been fused to the body 10 to create the channel.

Embodiments of the disclosure may provide gas delivery systems for trace detection equipment. It will be appreciated in the context of the present disclosure that the process described above may permit the channel to remain extremely clean without a need for washing or baking at high temperature as may have been advisable in prior art structures. It will also be appreciated that such structures enable provision of complicated 3D pneumatic pathways that need not employ elastomer seals or gaskets thereby reducing the occurrence of "outgassing" and/or unwanted "absorption" of vapours that can hinder a detector's performance.

The body 10 may comprise black 450G PEEK 903, and the film 12 may comprise natural APTIV PEEK film. The laser used to weld the film to the body may comprise a marking laser, for example a laser having a power less than 1000 watts, for example a laser having a power less than 50 watts, for example having a power of about 30 watts. Examples of such lasers comprise fiber lasers. In some embodiments a 30 watt fibre laser is used for welding the film to the body. One such laser comprises an AREX laser such as may be obtained from Datalogic S.p.A., Via Candini, 2, 40012 Lippo di Calderara di Reno, Bologna—Italy. The laser beam may comprise a defocussed spot, for example the laser may be adjusted so that the beam waist (or focal point of the laser) is spaced from the film 12 along the length of the beam.

FIG. 2-A illustrates a detection apparatus 100 in which channel assemblies as described above may be used. The detection apparatus 100 shown in FIG. 2-A comprises a detector 108 for detecting a substance of interest, a pneumatic system 132 adapted to allow one or more fluids to be provided into the detector 108, and a printed circuit board, PCB, 106 carrying control electronics 110 for controlling the detector 108. The PCB 106 also carries a plurality of pumps 112, which may be mechanical, for example the pumps may comprise piezoelectric pumps.

In the example illustrated in FIG. 2-A, the detection apparatus 100 further comprises a pneumatic interface 104 arranged to be seated on the PCB 106. The pneumatic interface 104 comprises a body 10' having a plurality of pneumatic channels 116-1, 116-2, 116-3. These channels may comprise channels such as those described above with reference to FIG. 1-A, FIG. 1-B, and FIG. 1-C. The body 10' may also comprise a plurality of pump couplings 126-1, 126-2, 126-3 arranged at the surface of the body 10' so that, when the interface 104 is seated on the PCB, the plurality of pump couplings 126-1, 126-2, 126-3 are each arranged to couple one of the channels 116-1, 116-2, 116-3 of the interface 104 to a corresponding one of the plurality of pumps 112-1, 112-2, 112-3.

In the example illustrated in FIG. 2-A, the detection apparatus 100 comprises an electrically conductive shield 102, interposed between the detector 108 on the one hand, and the pneumatic interface 104 and PCB 106 on the other hand. The electrically conductive shield 102 may comprise an aluminium plate and may be adapted to inhibit electromagnetic interference between the control electronics 110 and the detector 108.

The pneumatic interface 104 may comprise at least one output nozzle 122 (for example one output nozzle 122 for each pump), adapted to reach around the conductive shield 102 to connect the channels of the pneumatic interface 104 to a pneumatic system 132 of the detector.

As illustrated in FIG. 2-B, the pneumatic interface 104 may comprise a return channel 124 arranged to allow fluid to flow back from the detector to the plurality of piezoelectric pumps. The return channel 124 may be coupled separately to each of the pump couplings 126-1, 126-2, 126-3 by a corresponding plurality of plenums 120-1, 120-2, 120-3. Each plenum may comprise a cavity in the body of the interface 104 that is enclosed (for example by a polymer film). Such a cavity may have an internal volume selected based on the volume of fluid ejected in a single cycle of the corresponding pump, for example the plenum may have a volume that is selected to be at least ten times greater than the single cycle volume of a corresponding pump, for example at least one hundred times that volume.

As illustrated in FIG. 2-B the return channel 124 may be coupled by a first channel part 130-1 to a first plenum 120-1, and the first plenum 120-1 may be coupled to a first pump coupling 126-1 by a second channel part 130-2. The first pump coupling 126-1 may be coupled by a third channel part 116-1, an output channel, to a corresponding output nozzle 122 (such as the output nozzle 122 illustrated in FIG. 2-A). This channel arrangement comprising first channel part 130-1, plenum 120-1, second channel part 130-2, pump coupling 126-1, third channel part (output channel) 116-1, and output nozzle 122 may be repeated across the pneumatic interface 104. For example, the interface 104 illustrated in FIG. 2-B comprises three such channel arrangements, each of which are coupled to receive fluid from the return channel 124 as described above. At least one of these channel arrangements may comprise a further plenum 120-3' coupled between a pump coupling 126-3 and its output channel 116-3. As explained below, the channel parts leading into and out from such a further plenum 120-3' may be misaligned to improve damping, for example they may be mutually orthogonal.

The cross section of the return channel 124 may be selected to be at least as large as the sum of the cross sections of the output channels linking the plurality of pumps to the pneumatic system 132 of the detector.

In these channel arrangements, the second channel part 130-2 may be oriented with respect to the first channel part 130-1 to increase pneumatic damping between the first channel part 130-1 and the second channel part 130-2, for example the first channel part may be misaligned with the second channel part. For example the first channel part 130-1 and the second channel part may be mutually orthogonal.

The pneumatic system 132 of the detector may comprise a vapour dispenser, such as one of the vapour dispensers described and claimed in the applicant's co-pending patent application WO2014/045067.

FIG. 2-C illustrates one such pneumatic system 132 comprising a vapour dispenser adapted for dispensing vapour into the detector.

The vapour dispenser illustrated in FIG. 2-C comprises reservoir coupling 70 for coupling at least one reservoir of vapour to an input channel 60-4 for applying pressure to the reservoir, for example by coupling the reservoir to a pneumatic interface such as the interface 104 described above with reference to FIG. 2A and FIG. 2-B. The reservoir coupling 70 may also be coupled to a dispensing channel 60-1 for dispensing vapour to the detector 108 from a reservoir coupled to the reservoir coupling 70 to provide a vapour source. This dispensing channel 60-1 may be provided by a channel assembly 1 such as one described above with reference to FIG. 1-A, FIG. 1-B, and FIG. 1-C. In the embodiment of FIG. 2-C and FIG. 2-D however the film that is used to form this channel may be at least partially vapour permeable, for example it may comprise a silicone membrane. This may provide a wall of the channel that is configured to allow vapour to permeate through it. The dispensing channel 60-1 may comprise a plurality of dead-end channel parts. The other channels 60-2, 60-3, 60-4 illustrated in FIG. 2-C and FIG. 2-D may be similar.

As illustrated in FIG. 2-D a cartridge 62, 62' of an absorbent medium may be arranged against the dispensing channel 60-1 and/or the input channel 60-3. This cartridge 62, 62' may comprise an opening adapted to lie against the (permeable region of the) film 12' to allow the absorbent medium to absorb vapour that diffuses through the film 12. It can be seen in FIG. 2-C that the pneumatic system 132 comprises a seat recess 64 adapted to hold this cartridge 62 of absorbent material against the film 12. The seat recess 64 may comprise a release member 66, for example a releasable fixture such as a clip or screw that is reversibly actable to release a cartridge from the first seat and to secure a cartridge to the seat. This may enable the cartridge of absorbent medium to be replaced without the need to disassemble the apparatus, or to open the pneumatic system 132 thereby protecting it from contamination during maintenance.

It can be seen in FIG. 2-D that the pneumatic system 132 may also comprise a vapour store cartridge 66, which may also be replaceable. These vapour store cartridges 66 may comprise a reservoir of dopant. In some embodiments the cartridge may comprise a heater, for example a resistive heater such as a tape heater which may be operable to raise the temperature of a fluid held in the cartridge. The reservoir coupling 70 illustrated in FIG. 2C may comprise a power supply coupling arranged to provide power to such a heater, this power supply coupling may be arranged so that arranging the cartridge to supply vapour to the reservoir coupling 70 also arranges the heater carried by the cartridge to obtain a power supply from the electrical system 132 (e.g. via a battery connected to the electrical system 132).

The dopant may comprise a volatile substance such as methylene chloride, o-dichlorobenzene, carbon tetrachloride, hexachloroethane, methyl chloride, trichloromethane, chlorobenzene, methylene bromide, methyl bromide, methyl iodide, and nitrogen dioxide. In some embodiments the vapour store cartridge may also comprise a second reservoir of calibrant. Examples of calibrants include acetone and isoflurane.

In an embodiment a first pump of the PCB may be coupled, by the pneumatic interface 104, to provide pressure to a channel of the pneumatic system 132 illustrated in FIG. 2-C so as to pressurise the reservoir of dopant or calibrant that is coupled to that channel and to cause vapour to flow through the dispensing channel and into the detection apparatus 100. Accordingly, the control electronics carried on the PCB may be configured to operate the pumps to dose calibrant and/or dopant into the pneumatic system 132 of the detector. Accordingly, the control electronics carried on the PCB may be configured to control operation of the pumps based on operation of the detection system.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit. Ion mobility spectrometry has been described as one way of providing a detector for the apparatus described herein but it will be appreciated that other detection apparatus 100 may also make use of apparatus according to the present disclosure for example mass spectrometry detectors, and any kind of ion mobility based detector may be used, for example other ion mobility based detectors such as travelling wave IMS or differential ion mobility spectrometers. Other examples and variations will be apparent to the skilled addressee in the context of the present disclosure.

One particular method of providing channel assemblies has been described, but it will be appreciated that the modularity of the system described with reference to the drawings of FIG. 2 is advantageous in its own right and may be used with other kinds of channels. For example suitable channels may be provided by rapid prototyping systems, or by any other method of manufacture. Embodiments of the disclosure relate to pneumatic interfaces, and to the pneumatic system used in the vapour dispenser 132, and to data files configured to allow a 3D printing apparatus to manufacture such components.

As will be appreciated in the context of the present disclosure, microfluidic systems may comprise systems, such as channels, in which fluids can be geometrically constrained in spaces having at least one dimension (width, depth, length) that is less than one millimetre. Generally therefore, channels of the present disclosure which are labelled as "microfluidic" channels may comprise systems in which the width and/or depth of a channel (e.g. the channel diameter) is of the order of a few hundred nanometres to several hundred micrometres.

In some embodiments the pumps described herein may comprise micro pumps, which may be mechanical or non-mechanical. For example mechanical micro pumps may comprise an actuator and valve membranes or flaps. The driving force of such pumps can be provided by piezoelectric, electrostatic, thermo-pneumatic, pneumatic or magnetic effects. Non-mechanical pumps may be provided which employ electro-hydrodynamic, electro-osmotic, electrochemical or ultrasonic flow generation. Other types of pumps may be used.

Reference is made above to a nozzle that links the pneumatic interface 102 to the pneumatic system 132 of the detector 108, but it will be appreciated that any appropriate fluid coupling may be used, for example a recess, adapted to receive a nozzle may be used, or the relevant components may be sealed together using a sealant adhesive, or using a gasket and clamp.

The electronic components which control the detection devices described herein may comprise user interface components, such as human input devices and feedback devices such as displays. In addition the electronic components may comprise control circuitry for applying control voltages and currents to the detection apparatus 100. Examples of the disclosure may comprise voltage providers for such a purpose. Such voltage providers may comprise an AC power supply, which may comprise one or more step-up or step down transformers, the voltage providers may also comprise DC power supplies such as batteries or fuel cells or capacitive power stores. Combinations of AC and DC power may be used and the voltage provider may comprise an inverter for providing an AC voltage based on a DC power supply. In some embodiments the voltage provider may comprise rectifiers for providing DC voltage based on an AC power supply. Any combination of AC and DC power supply and voltage providing components may be used. In some embodiments the voltage provider may also operate as a current source. In some examples the electronic components may comprise signal processing circuitry such as amplifiers, for example instrumentation amplifiers.

As described herein, an aspect of the present disclosure provides a microfluidic channel assembly comprising: a polymer film having a thickness of less than 1 mm and being secured to a surface of a polymer body having a thickness of at least 2 mm, wherein an elongate groove is disposed in the surface of the polymer body beneath the polymer film, wherein the polymer film and the polymer body comprise the same polymer and the polymer film and polymer body are at least partially fused together along an elongate track that follows the elongate groove along the surface so that the film and elongate track together enclose the groove to provide a microfluidic channel.

In an embodiment the elongate track may be separated from the elongate groove along its length by less than a selected distance, wherein the distance is determined by at least one of the thickness of the polymer film and the width of the elongate track.

In an embodiment the non-fused region of the polymer film separates the elongate track from the elongate groove.

In an embodiment the elongate track runs parallel to the elongate groove.

In an embodiment the elongate track comprises at least two elongate tracks arranged on opposite major sides of the elongate groove.

In an embodiment at least one optical transmission property of the material of the polymer film is different from the same optical transmission property of the material of the polymer body. In an embodiment the optical transmission property comprises at least one of refractive index and thermal absorbance of optical energy in a wavelength range of 500 nm to 1500 nm.

In an embodiment the polymer body comprises an additive, wherein the additive comprises a material that absorbs light energy to provide thermal energy.

In an embodiment along the track the material of the film is at least partially diffused into the material of the body.

In an embodiment the polymer comprises PEEK.

As described herein, an aspect of the present disclosure provides a detection apparatus comprising: a detector for detecting a substance of interest, the detector comprising a pneumatic system; a printed circuit board, PCB, carrying control electronics for controlling the detector and a plurality of piezoelectric pumps; a pneumatic interface arranged to be seated on the PCB and comprising a body having a plurality of pneumatic channels for coupling with the pneumatic system and a plurality of pump couplings arranged at the surface of the body so that, when the interface is seated on the PCB, the plurality of pump couplings are each aligned with a corresponding one of the plurality of piezoelectric pumps to couple each pump to a corresponding channel of the plurality of pneumatic channels.

In an embodiment the pneumatic interface comprises a return channel arranged to allow fluid to flow back from the detector to the plurality of piezoelectric pumps.

In an embodiment at least one of the channels is coupled to a corresponding one of the pumps by a plenum.

In an embodiment a first channel part couples the pump coupling to the plenum, and a second channel part couples the plenum to the pneumatic interface wherein the first channel part and the second channel part are mutually orthogonal.

In an embodiment the pneumatic interface and the PCB are mechanically separated from the detector by an electrically conductive shield.

In an embodiment the pneumatic interface is arranged between the PCB and the electrically conductive shield.

In an embodiment the pneumatic system of the detector comprises a vapour dispenser.

As described herein, an aspect of the present disclosure provides a detection apparatus comprising: a detector for detecting a substance of interest; a pneumatic system comprising a vapour dispenser adapted for dispensing vapour into the detector wherein the vapour dispenser comprises a first channel for dispensing vapour to the detector, wherein the channel comprises a groove in a surface of a polymer body and a wall of the first channel is provided by a film bonded to the surface of the body over the groove wherein the film is configured to allow vapour to diffuse through the wall.

In an embodiment the film comprises one of a silicone membrane and a polymer film having a thickness of less than 150 microns.

In an embodiment the apparatus further comprises a first cartridge of an absorbent medium, said first cartridge comprising an opening adapted to be seated against the film to allow the absorbent medium to absorb vapour that diffuses through the film.

In an embodiment a first seat is adapted to hold the first cartridge against the film. In an embodiment the apparatus comprises a first release member that is reversibly actable to release a cartridge from the first seat and to secure a cartridge to the seat.

In an embodiment the apparatus comprises the vapour store. In an embodiment the apparatus comprises a second channel for coupling the vapour store to a pump.

In an embodiment the apparatus comprises a seat for coupling the vapour store to receive fluid pressure from the second channel and to provide vapour to the first channel.

In an embodiment at least one of the channels is provided by a channel assembly according to any one described or claimed herein.

As described herein, an aspect of the present disclosure provides a method of forming a microfluidic channel, the method comprising: providing a polymer body having an elongate groove disposed in a surface of the polymer body having a thickness of at least 2 mm; assembling a polymer film having a thickness of less than 1 mm to the surface; fusing the polymer film to the polymer body along an elongate track that follows the elongate groove along the surface so that the film and elongate track together enclose the groove to provide a microfluidic channel.

In an embodiment fusing the polymer film to the polymer body comprises applying a laser along a welding track that follows the elongate groove along its length. In an embodiment the track is spaced from the groove by less than a selected distance, wherein the distance is selected based on at least one of the thickness of the polymer film and a power of the laser. In an embodiment the distance is selected to ensure that a non-fused region of the polymer film separates the elongate track from the elongate groove. In an embodiment the power of the laser is less than 50 watts, for example between 10 and 50 watts, for example about 30 watts. In an embodiment the laser is a fiber laser. In an embodiment the polymer body comprises a material adapted to cause heating when exposed to light in the wavelength range 1060 nm to 1080 nm.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The uses and operations of the apparatus described herein are intended also as a disclosure of the method, and the particular structure of the apparatus may not be relevant—therefore features of apparatus embodiments may be combined with the method embodiments described and claimed herein. Likewise, the methods described herein may be implemented by suitable configuration of the apparatus disclosed herein. Where appropriate, the activities and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

Where reference is made to electrodes it will be appreciated that any arrangement of conductors may be used, for example electrodes may comprise metals or other conductors and may be at least partially exposed and/or partially insulated.

The invention claimed is:

1. A detection apparatus comprising:
An ion mobility spectrometer (IMS), for detecting a substance of interest, the IMS comprising a pneumatic system;
a pneumatic interface arranged to be seated on a PCB, the pneumatic interface comprising:
a body having a plurality of pneumatic channels for coupling with the pneumatic system of the IMS;
a plurality of pump couplings arranged at the surface of the body so that, when the interface is seated on the PCB, the plurality of pump couplings are each aligned with a corresponding one of a plurality of pumps to couple each of the plurality of pumps to a corresponding channel of the plurality of pneumatic channels; and
an electrically conductive shield interposed between the IMS and the PCB to inhibit electromagnetic interference between the PCB and the IMS.

2. The apparatus of claim 1, wherein the pneumatic interface comprises a return channel arranged to allow fluid to flow back from the IMS to the plurality of pumps.

3. A detection apparatus comprising:
a detector for detecting a substance of interest, the detector comprising a pneumatic system;
a pneumatic interface arranged to be seated on a PCB, the pneumatic interface comprising:
a body having a plurality of pneumatic channels for coupling with the pneumatic system of the detection apparatus; and
a plurality of pump couplings arranged at the surface of the body so that, when the interface is seated on the PCB, the plurality of pump couplings are each aligned with a corresponding one of a plurality of pumps to couple each of the plurality of pumps to a corresponding channel of the plurality of pneumatic channels, wherein at least one of the plurality of pneumatic channels is coupled to a corresponding one of the plurality of pump couplings by a plenum, and wherein a first channel part couples the pump coupling to the plenum, and a second channel part couples the plenum to the pneumatic interface, the first channel part and the second channel part being mutually orthogonal.

4. The detection apparatus of claim 1, further comprising:
a vapour store;
a second channel for coupling the vapour store to a pump; and
a seat for coupling the vapour store to receive fluid pressure from the second channel and to provide vapour to a first channel.

5. A detection apparatus comprising:
an ion mobility spectrometer (IMS) for detecting a substance of interest, the IMS comprising a pneumatic system;
a pneumatic interface arranged to be seated on a PCB, the pneumatic interface comprising:
a body having a plurality of pneumatic channels for coupling with the pneumatics system of the IMS; and
a plurality of pump couplings arranged at the surface of the body so that, when the interface is seated on the PCB, the plurality of pump couplings are each aligned with a corresponding one of a plurality of pumps to couple each pump to a corresponding channel of the plurality of pneumatic channels;
wherein the pneumatic channels comprise at least a first microfluidic channel for dispensing at least one of a dopant or a calibrant to the IMS, wherein the first microfluidic channel comprises a groove in a surface of a polymer body, and a wall of the first channel is provided by a film bonded to the surface of the body over the groove.

6. The apparatus of claim 5, wherein at least one of the plurality of pumps of the PCB is coupled by the pneumatic interface to provide pressure to a corresponding channel of the pneumatic system to pressurize a reservoir of the at least one of a dopant or a calibrant that is coupled to the channel, and to cause the at least one of a dopant or a calibrant to flow through the channel and into the IMS.

7. The detection apparatus of claim 5, wherein the film is secured to the polymer body by the film and the polymer body being at least partially fused together along an elongate track, the groove being bounded on each side by the track.

8. The detection apparatus of claim 5, wherein the polymer body comprises a material that absorbs light in a wavelength range in which the film transmits light.

9. The detection apparatus of claim 5 wherein the polymer body comprises a material adapted to cause heating when exposed to light in the wavelength range 1060 nm to 1080 nm.

10. The detection apparatus of claim 5, further comprising a first cartridge of an absorbent medium, the first cartridge including an opening adapted to be seated against the film to allow the absorbent medium to absorb vapour that diffuses through the film.

11. The detection apparatus of claim 1, wherein the plurality of pneumatic channels includes a first microfluidic channel for dispensing vapour to the IMS, the first microfluidic channel comprising a groove in a surface of a polymer body, and a wall of the first microfluidic channel being provided by a film bonded to the surface of the polymer body over the groove.

12. The detection apparatus of claim 11, wherein the film is secured to the polymer body by the film and the polymer body being at least partially fused together along an elongate track, the groove being bounded on each side by the track.

13. The detection apparatus of claim 11, wherein the polymer body comprises a material that absorbs light in a wavelength range in which the film transmits light.

14. The detection apparatus of claim 11, wherein the polymer body comprises a material adapted to cause heating when exposed to light in the wavelength range 1060 nm to 1080 nm.

15. The detection apparatus of claim 11, further comprising a first cartridge of an absorbent medium, the first cartridge including an opening adapted to be seated against the film to allow the absorbent medium to absorb vapour that diffuses through the film.

16. The detection apparatus of claim 3, wherein the plurality of pneumatic channels includes a first microfluidic channel for dispensing vapour to the detector, the first microfluidic channel comprising a groove in a surface of a polymer body, and a wall of the first microfluidic channel being provided by a film bonded to the surface of the polymer body over the groove.

17. The detection apparatus of claim 16, wherein the film is secured to the polymer body by the film and the polymer body being at least partially fused together along an elongate track, the groove being bounded on each side by the track.

18. The detection apparatus of claim 16, wherein the polymer body comprises a material that absorbs light in a wavelength range in which the film transmits light.

19. The detection apparatus of claim 16, wherein the polymer body comprises a material adapted to cause heating when exposed to light in the wavelength range 1060 nm to 1080 nm.

20. The detection apparatus of claim 16, further comprising a first cartridge of an absorbent medium, the first cartridge including an opening adapted to be seated against the film to allow the absorbent medium to absorb vapour that diffuses through the film.

* * * * *